United States Patent [19]

Oguro et al.

[11] Patent Number: 5,100,615
[45] Date of Patent: Mar. 31, 1992

[54] ALLOYS OF TI-CR-CU FOR OCCLUDING HYDROGEN

[75] Inventors: Keisuke Oguro; Mutsuo Tanaka, both of Ikeda; Hiroshi Miyamura, Toyonaka, all of Japan

[73] Assignee: Agency of Industrial Science & Technology, Ministry of International Trade & Industry, Tokyo, Japan

[21] Appl. No.: 571,865

[22] Filed: Aug. 24, 1990

[30] Foreign Application Priority Data

Sep. 11, 1989 [JP] Japan ................................ 1-236687

[51] Int. Cl.$^5$ ............................................. C22C 22/00
[52] U.S. Cl. ................................... 420/417; 420/421; 420/900; 423/644; 429/101
[58] Field of Search ................... 420/417, 421, 900; 423/644; 429/101

[56] References Cited

U.S. PATENT DOCUMENTS 4,946,646 9/1990 Gamo et al. ...................... 420/580

FOREIGN PATENT DOCUMENTS 0176067 8/1986 Japan .
1577830 10/1980 United Kingdom .

OTHER PUBLICATIONS

Rajalakshmi et al., Jour. Less-Comm. Metals, 128 (1987) 57.
Inorganic Chemistry, vol. 17, No. 11, 1978, pp. 3103-3108, J. R. Johnson, et al., "Reaction of Hydrogen with the Low-Temperature Form (C15) of $TiCr_2$".
Journal of the Less-Common Metals, 89, 1983, pp. 257-262, T. Sujioka, et al., "Hydrogen Storage Properties of $Ti_{1+x}Cr_{2-y}Mn_y$ Alloys".
Journal of the Less-Common Metals, 88, 1982, pp. 107-114, J. R. Johnson, et al., "On the Existence of F.C.C. $TiCr_{1.8}H_{5.3}$".
Journal of the Less-Common Metals, 73, 1980, pp. 345-354, J. R. Johnson, "Reaction of Hydrogen with the High Temperature (C14) Form of $TiCr_2$".

Primary Examiner—Upendra Roy
Attorney, Agent, or Firm—Oblon, Spivak, McClelland, Maier & Neustadt

[57] ABSTRACT

An alloy for occluding hydrogen is represented by the formula $TiCr_xCu_y$ (wherein x and y stand for numerical values satisfying the expressions, $0.01 \leq y \leq 0.4$ and $1.3 \leq x+y \leq 2.0$) and has an ability to occlude hydrogen at a lower temperature than the temperatures required by the conventional countertypes for occluding hydrogen.

1 Claim, 1 Drawing Sheet

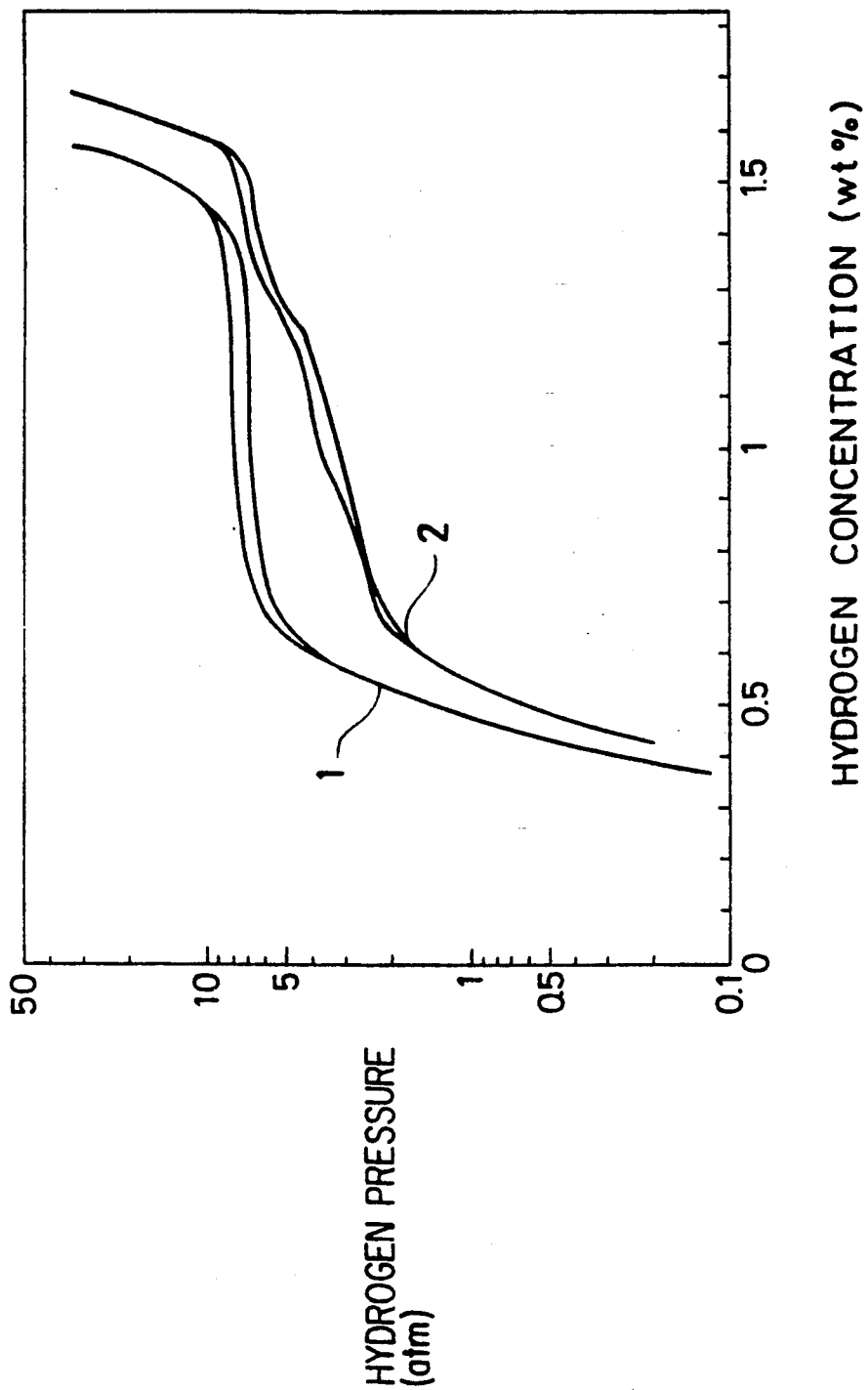

ALLOYS OF TI-CR-CU FOR OCCLUDING HYDROGEN

BACKGROUND OF THE INVENTION

1. Field of the Invention

This invention relates to an alloy for the occlusion of hydrogen. This alloy can be used for the occlusion of hydrogen at a lower temperature than the temperatures required by the conventional alloys for occluding hydrogen.

Alloys for occluding hydrogen capable of directly reacting with hydrogen gas, quickly occluding the hydrogen gas in a large volume and releasing the occluded hydrogen gas have been various techniques such as the energy conversion technique applied to under development. The hydrogenation of an alloy for occluding hydrogen entails evolution of a large amount of heat of reaction. Therefore, the alloy for occluding hydrogen can be utilized for thermochemical energy conversion. Furthermore, it can be utilized for thermomechanical energy conversion by using the pressure of hydrogen occluded in the alloy and for electrochemical energy conversion by using itself as an electrode. As regards the storage of energy, this alloy can store hydrogen in a higher density than liquefied hydrogen and can store various forms of energy as converted into chemical energy. Thus, it is possible for the alloy to store energy such as heat energy, mechanical energy, and electric energy, besides storage of hydrogen gas. Specifically, practical application of the alloy for occluding hydrogen to heat pumps or secondary batteries is approaching realization.

2. Prior Art Statement

The alloy for occluding hydrogen of this nature is required to fulfill the following requirements:

(1) It should possess a hydrogen-occluding pressure and a hydrogen-releasing pressure both allowing easy treatment under working temperature conditions.

(2) It should exhibit a high hydrogen-occluding speed and a high hydrogen-releasing speed under working temperature conditions.

(3) It should allow a large amount of hydrogen gas to be repeatedly occluded and released under working temperature conditions and pressure conditions.

(4) It should be easily activated during the course of initial hydrogenation.

(5) It should produce only a small difference between the hydrogen pressure required for hydrogen occlusion and that for hydrogen release.

(6) It should possess durability high enough to permit repeated occlusion and release of hydrogen gas for a long time.

(7) It should enjoy low cost of raw materials.

As alloys for occluding hydrogen of this description, $LaNi_5$ and $FeTi$ have been known to the art. Unfortunately, only a few known alloys such as, for example, $TiCr_{1.8}$ (Inorganic Chemistry, vol. 17, pp. 3103–3108, 1978) and $Ti_{1.2}Cr_{1.2}Mn_{0.8}$ (Journal of the Less-Common Metals, vol. 89, pp. 257–262(1983) and Japanese Patent Publication SHO 59(1984)-7774) fulfill these conditions at temperatures lower than normal room temperature.

In the known alloys mentioned above, $TiCr_{1.8}$ reversibly occludes and releases hydrogen gas at the lowest temperature. This alloy exhibits a hydrogen-releasing pressure of about 2 atmospheres at $-78°$ C. In order to utilize the cooling function of an alloy resulting from the release of hydrogen in a low temperature range, the alloy is required to exhibit a higher release pressure at a lower temperature than $TiCr_{1.8}$.

Further, the production of $TiCr_{1.8}$ possessing a stated quality requires a heat treatment to be performed at 1,000° C. for three to four weeks and, therefore, entails a drawback of high cost.

It is, therefore, an object of this invention to provide an alloy which fulfills all of the requirements (1) to (7) mentioned above in a lower temperature range then $TiCr_{1.8}$ and which can be produced without necessitating such a protracted heat treatment as in the production of $TiCr_{1.8}$.

SUMMARY OF THE INVENTION

To accomplish the object described above, the present inventors have made various studies, to find that an alloy derived from the aforementioned alloy for occluding hydrogen, $TiCr_{1.8}$, by substituting Cu for part of the Cr component thereof and changing the ratio of the total amount of Cr and Cu components to the amount of Ti component possesses an outstanding hydrogen-occluding properties. The present invention has been perfected as the result.

To be specific, the present invention is directed to a titanium-chromium-copper alloy for occluding hydrogen represented by the formula, $TiCr_xCu_y$, wherein x and y are numerical values satisfying the expressions $0.01 \leq y \leq 0.4$ and $1.3 \leq x + y \leq 2.0$.

The above and other features and objects of the invention will become apparent with the following detailed description made with reference to the attached drawing.

BRIEF DESCRIPTION OF THE DRAWING

The drawing is a graph showing the pressure-composition isotherms of the alloys of Example 1 and Comparative Experiment at $-60°$ C.

DETAILED DESCRIPTION OF THE PREFERRED EMBODIMENTS

In the alloy of the present invention represented by the foregoing formulas, if y is less than 0.01, the alloy for the sake of exhibiting a high release pressure at low temperatures requires a protracted heat treatment. Conversely, if y exceeds 0.4, the produced alloy is conspicuously deficient in practicality because it acquires an unduly small available capacity for hydrogen occlusion. If $x + y$ is less than 1.4 or not less than 2.0, the produced alloy suffers from poor practicality because the available capacity for hydrogen occlusion is unduly small.

Particularly for the alloy of the present invention to be produced solely by a brief heat treatment and enabled to exhibit a higher release pressure in a lower temperature range and enjoy a larger available capacity for hydrogen occlusion, it is desirable that y should be in the range represented by the expression, $0.02 \leq y \leq 0.3$, and $x + y$ in the range represented by the expression, $1.5 \leq x + y \leq 1.9$.

The alloy of the present invention can be produced by any of the conventional methods. Among other conceivable known methods, the arc melting method and the radio-frequency induction melting method to be performed both in an atmosphere of inert gas prove to be particularly desirable. Specifically, a cast ingot of this alloy is obtained by weighing Ti, Cr, and Cu metals in stated relative amounts, mixing them, placing the mixture in an arc melting furnace or a radio-frequency induction melting furnace, heating and melting the mixture under an atmosphere of argon, for example, and allowing the molten mixture to stand and cool off in a mold.

The cast alloy ingot thus obtained is desired to be homogenized by a heat treatment to be performed under an inert gas atmosphere at 800° C. for 3 to 6 hours.

The alloy consequently obtained can be quickly activated by being mechanically pulverized to a particle size of not more than 30 mesh, placed in a pressureproof container made of stainless steel, deaerated under a vacuum at 80° C. for 1 hour, and then exposed to hydrogen of 25 atmospheres introduced thereto at −60° C. After the activation, this alloy occludes hydrogen when it is exposed to hydrogen pressure of 10 atmospheres at −60° C. Then, it releases hydrogen when the hydrogen pressure is lowered to 5 atmospheres. It can reversibly repeat the occlusion and release of hydrogen.

The procedure of causing the alloy for occluding hydrogen of the present invention to occlude hydrogen therein and then release this hydrogen by lowering the pressure to the normal pressure can be expected to bring about a freezing action capable of cooling the ambience to −80° C. or lower temperatures. When the alloy for occluding hydrogen which has occluded hydrogen is heated to room temperature, it generates a hydrogen pressure exceeding 100 atmospheres. Owing to this phenomenon, the alloy for occluding hydrogen can be utilized for a hydrogen gas compressor or a high-pressure generator. Since the production of this alloy does not require a protracted heat treatment, this alloy enjoys a lower cost of production than the known alloy, $TiCr_{1.8}$.

Now, the present invention will be described more specifically below with reference to working examples and a comparative experiment.

EXAMPLE 1

Commercially available Ti, Cr, and Cu pieces were weighed out in a total weight of about 6 g in proportions forming an atomic ratio of Ti:Cr:Cu=1:1.6:0.1 and melted with an argon arc in a water-cooled copper crucible. The cast ingot consequently obtained was heat-treated in a vacuum at 800° C. for 6 hours. The cast ingot was ground to remove oxide and other extraneous substances from the surface thereof. The cast ingot remaining after the grinding was pulverized to a particle size in the range of 100 to 200 mesh. Thus, there was obtained a $TiCr_{1.6}Cu_{0.1}$ alloy powder.

When a sample of the alloy powder was tested for crystal structure by the powder X-ray diffraction method, the alloy powder was found to possess a unitary phase of the same cubic Laves-phases structure (lattice constant, a=6.93 Å) as the known alloy, $TiCr_{1.8}$.

When 1 g of the alloy powder was packed in a pressureproof container of stainless steel having an inner volume of 1 cc, deaerated under a vacuum at 80° C. for 1 hour, and then exposed to hydrogen of a pressure of 25 atmospheres introduced thereto at −60° C., it quickly occluded hydrogen. When the hydrogen-occluding property of the alloy powder was examined by the use of a Sieverts' type device, there was obtained a pressure-composition isotherm indicated by Curve 1 in the diagram. It is clearly noted from the curve that the release pressure at −60° C. was 7.0 atmospheres and the available capacity for hydrogen occlusion was 0.75% by weight exclusively of the plateau part. The hysterisis representing the difference between the occluding pressure and the releasing pressure was found to be small.

EXAMPLES 2 TO 5

Alloys of Ti, Cr, and Cu were produced by following the procedure of Example 1, except that Ti, Cr, and Cu pieces were weighed out in proportions forming various atomic ratios, Ti:Cr:Cu=1:1.4:0.1, 1:1.8:0.1, 1:1.7:0.02, and 1:1.5:0.3. Consequently, there were obtained alloy powders of the compositions of $TiCr_{1.4}Cu_{0.1}$, $TiCr_{1.8}Cu_{0.1}$, $TiCr_{1.7}Cu_{0.02}$, and $TiCr_{1.5}Cu_{0.3}$.

All of these alloy powders possessed the same crystal structure as the alloy powder of Example 1 and were easily hydrogenated. The hydrogen-occluding properties of these alloy powders are shown collectively together with those of the alloy powder of Example 1 in Table 1.

TABLE 1

| Example | Alloy | Release pressure (atmospheres) at −60° C. | Available capacity for hydrogen occlusion in plateau part (% by weight) |
|---|---|---|---|
| 1 | $TiCr_{1.6}Cu_{0.1}$ | 7.0 | 0.75 |
| 2 | $TiCr_{1.4}Cu_{0.1}$ | 6.5 | 0.55 |
| 3 | $TiCr_{1.8}Cu_{0.1}$ | 7.0 | 0.63 |
| 4 | $TiCr_{1.7}Cu_{0.02}$ | 5.5 | 0.73 |
| 5 | $TiCr_{1.5}Cu_{0.3}$ | 8.0 | 0.50 |

COMPARATIVE EXPERIMENT 1

An alloy of Ti and Cr was produced by following the procedure of Example 1, except that Ti and Cr pieces were weighed out in a proportion forming an atomic ratio, Ti:Cr=1:1.8. Consequently, there was obtained an alloy powder of the composition of $TiCr_{1.8}$. The heat treatment was carried out in a vacuum at 800° C. for 6 hours similarly to that of Example 1. Though this alloy powder for comparison occluded hydrogen under the same conditions as those of Example 1, the pressure-composition isotherm of this alloy powder at −60° C. had an inclined plateau as indicated by Curve 2 in the diagram The release pressure was 4 atmospheres.

In accordance with the present invention, the alloy allows hydrogen to be occluded and released in a low temperature range not attainable by any of the conventional alloys as described above. Thus, the alloy promises efficient storage of heat at a temperature below −80° C. and realization of a low temperature system such as a heat-pump type refrigerator. It further enjoys the advantage that it effects cooling to a lower temperature than the known alloy, $TiCr_{1.8}$ and has a low cost of production because it does not require a protracted heat treatment during the course of alloy production.

What is claimed:

1. A titanium-chromium-copper alloy for occluding hydrogen represented by the formula, $TiCr_xCu_y$, wherein x and y stand for numerical values satisfying the expressions, $0.02 \leq y \leq 0.3$ and $1.5 \leq x+y \leq to 1.9$.

* * * * *